(12) United States Patent
Prasad et al.

(10) Patent No.: US 7,974,899 B1
(45) Date of Patent: *Jul. 5, 2011

(54) ATOMIC DEPOSIT TRANSACTION

(75) Inventors: Bharat Prasad, San Antonio, TX (US); Jeffrey N. Pollack, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/242,107

(22) Filed: Sep. 30, 2008

(51) Int. Cl.
*G06Q 40/00* (2006.01)

(52) U.S. Cl. ............ 705/35; 705/37; 235/380; 382/137; 209/534

(58) Field of Classification Search ............... 705/38, 705/44; 235/379
See application file for complete search history.

(56) References Cited

U.S. PATENT DOCUMENTS

| | | |
|---|---|---|
| 3,341,820 A | 9/1967 | Grillmeier, Jr. |
| 3,576,972 A | 5/1971 | Wood |
| 3,593,913 A | 7/1971 | Bremer |
| 3,620,553 A | 11/1971 | Donovan marion |
| 3,648,242 A | 3/1972 | Grosbard |
| 3,816,943 A | 6/1974 | Henry |
| 4,002,356 A | 1/1977 | Weidmann |
| 4,060,711 A | 11/1977 | Buros |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,523,330 A | 6/1985 | Cain |
| 4,636,099 A | 1/1987 | Goldstone |
| 4,640,413 A | 2/1987 | Kaplan |
| 4,644,144 A | 2/1987 | Chandek |
| 4,722,444 A | 2/1988 | Murphy |
| 4,727,435 A | 2/1988 | Otani et al. |
| 4,774,663 A | 9/1988 | Musmanno |
| 4,790,475 A | 12/1988 | Griffin |

(Continued)

FOREIGN PATENT DOCUMENTS

EP 984410 A1 3/2000

OTHER PUBLICATIONS

J.D. Tygar, Atomicity in Electronic Commerce, Apr./May 1998 (Atomicity).*

(Continued)

*Primary Examiner* — Ella Colbert
*Assistant Examiner* — Chika Ojiaku
(74) *Attorney, Agent, or Firm* — Chadbourne & Parke LLP; Walter G. Hanchuk

(57) ABSTRACT

A user may generate a digital image of a negotiable instrument such as a check. The digital image may be transmitted to an institution in a digital image file for deposit of the check. After the user selects to submit the digital image file, the digital image file may be sent from a user computing device to the institution. The user computing device may be decoupled from the transaction once the submission of the digital image file for deposit of the check is made. The transaction is thereafter managed by the institution. Incomplete transactions are avoided by moving the transaction processing to the server side at the institution after the user submits the digital image file. This may be referred to as an atomic deposit transaction.

24 Claims, 7 Drawing Sheets

U.S. PATENT DOCUMENTS

| | | | |
|---|---|---|---|
| 4,806,780 A | 2/1989 | Yamamoto | |
| 4,837,693 A | 6/1989 | Schotz | |
| 4,890,228 A | 12/1989 | Longfield | |
| 4,927,071 A | 5/1990 | Wood | |
| 4,934,587 A | 6/1990 | Mcnabb | |
| 4,960,981 A | 10/1990 | Benton | |
| 4,975,735 A | 12/1990 | Bright | |
| 5,022,683 A | 6/1991 | Barbour | |
| 5,053,607 A | 10/1991 | Carlson | |
| 5,157,620 A | 10/1992 | Shaar | |
| 5,159,548 A | 10/1992 | Caslavka | |
| 5,191,525 A * | 3/1993 | LeBrun et al. | 715/229 |
| 5,220,501 A | 6/1993 | Lawlor | |
| 5,237,159 A | 8/1993 | Stephens | |
| 5,265,008 A | 11/1993 | Benton | |
| 5,321,816 A * | 6/1994 | Rogan et al. | 705/42 |
| 5,350,906 A | 9/1994 | Brody | |
| 5,373,550 A | 12/1994 | Campbell | |
| 5,419,588 A | 5/1995 | Wood | |
| 5,422,467 A | 6/1995 | Graef | |
| 5,504,538 A | 4/1996 | Tsujihara | |
| 5,583,759 A | 12/1996 | Geer | |
| 5,590,196 A | 12/1996 | Moreau | |
| 5,594,225 A | 1/1997 | Botvin | |
| 5,598,969 A | 2/1997 | Ong | |
| 5,602,936 A | 2/1997 | Green | |
| 5,610,726 A * | 3/1997 | Nonoshita et al. | 358/442 |
| 5,611,028 A | 3/1997 | Shibasaki | |
| 5,630,073 A | 5/1997 | Nolan | |
| 5,668,897 A | 9/1997 | Stolfo | |
| 5,673,320 A | 9/1997 | Ray | |
| 5,677,955 A | 10/1997 | Doggett | |
| 5,679,938 A | 10/1997 | Templeton | |
| 5,680,611 A | 10/1997 | Rail | |
| 5,691,524 A | 11/1997 | Josephson | |
| 5,737,440 A | 4/1998 | Kunkler | |
| 5,751,842 A | 5/1998 | Riach | |
| 5,830,609 A | 11/1998 | Warner | |
| 5,832,463 A | 11/1998 | Funk | |
| 5,863,075 A | 1/1999 | Rich | |
| 5,870,456 A | 2/1999 | Rogers | |
| 5,870,724 A | 2/1999 | Lawlor | |
| 5,878,337 A | 3/1999 | Joao | |
| 5,897,625 A | 4/1999 | Gustin | |
| 5,903,878 A | 5/1999 | Talati | |
| 5,903,881 A | 5/1999 | Schrader | |
| 5,910,988 A | 6/1999 | Ballard | |
| 5,917,931 A | 6/1999 | Kunkler | |
| 5,924,737 A | 7/1999 | Schrupp | |
| 5,926,548 A | 7/1999 | Okamoto | |
| 5,930,778 A | 7/1999 | Geer | |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin | |
| 6,012,048 A | 1/2000 | Gustin | |
| 6,021,202 A | 2/2000 | Anderson | |
| 6,029,887 A | 2/2000 | Furuhashi | |
| 6,030,000 A | 2/2000 | Diamond | |
| 6,032,137 A | 2/2000 | Ballard | |
| 6,038,553 A | 3/2000 | Hyde | |
| 6,073,119 A | 6/2000 | Bornemisza-wahr | |
| 6,085,168 A | 7/2000 | Mori | |
| 6,097,834 A | 8/2000 | Krouse | |
| 6,097,885 A | 8/2000 | Rayner | |
| 6,105,865 A | 8/2000 | Hardesty | |
| 6,145,738 A | 11/2000 | Stinson | |
| 6,151,426 A | 11/2000 | Lee | |
| 6,159,585 A | 12/2000 | Rittenhouse | |
| 6,170,744 B1 | 1/2001 | Lee | |
| 6,188,506 B1 | 2/2001 | Kaiserman | |
| 6,189,785 B1 | 2/2001 | Lowery | |
| 6,199,055 B1 | 3/2001 | Kara | |
| 6,243,689 B1 | 6/2001 | Norton | |
| 6,278,983 B1 | 8/2001 | Ball | |
| 6,282,826 B1 | 9/2001 | Richards | |
| 6,304,860 B1 | 10/2001 | Martin, Jr. | |
| 6,314,452 B1 * | 11/2001 | Dekel et al. | 709/203 |
| 6,317,727 B1 | 11/2001 | May | |
| 6,339,658 B1 | 1/2002 | Moccagatta | |
| 6,363,164 B1 | 3/2002 | Jones et al. | |
| 6,390,362 B1 | 5/2002 | Martin | |
| 6,397,196 B1 | 5/2002 | Kravetz | |
| 6,413,305 B1 | 7/2002 | Mehta | |
| 6,417,869 B1 | 7/2002 | Do | |
| 6,425,017 B1 | 7/2002 | Dievendorff | |
| 6,429,952 B1 | 8/2002 | Olbricht | |
| 6,449,397 B1 | 9/2002 | Che-chu | |
| 6,450,403 B1 | 9/2002 | Martens | |
| 6,464,134 B1 | 10/2002 | Page | |
| 6,470,325 B1 | 10/2002 | Leemhuis | |
| 6,505,178 B1 | 1/2003 | Flenley | |
| 6,574,609 B1 | 6/2003 | Downs | |
| 6,578,760 B1 | 6/2003 | Otto | |
| 6,587,837 B1 | 7/2003 | Spagna | |
| 6,609,200 B2 | 8/2003 | Anderson | |
| 6,643,416 B1 | 11/2003 | Daniels | |
| 6,661,910 B2 | 12/2003 | Jones et al. | |
| 6,672,452 B1 | 1/2004 | Alves | |
| 6,682,452 B2 | 1/2004 | Quintus | |
| 6,695,204 B1 | 2/2004 | Stinson | |
| 6,726,097 B2 | 4/2004 | Graef | |
| 6,728,397 B2 | 4/2004 | Mcneal | |
| 6,742,128 B1 | 5/2004 | Joiner | |
| 6,755,340 B1 | 6/2004 | Voss | |
| 6,781,962 B1 | 8/2004 | Williams | |
| 6,786,398 B1 | 9/2004 | Stinson | |
| 6,789,054 B1 | 9/2004 | Makhlouf | |
| 6,829,704 B2 | 12/2004 | Zhang | |
| 6,844,885 B2 | 1/2005 | Anderson | |
| 6,856,965 B1 | 2/2005 | Stinson | |
| 6,883,140 B1 | 4/2005 | Acker | |
| 6,902,105 B2 | 6/2005 | Koakutsu | |
| 6,913,188 B2 | 7/2005 | Wong | |
| 6,931,591 B1 | 8/2005 | Brown | |
| 6,934,719 B2 | 8/2005 | Nally | |
| 6,957,770 B1 | 10/2005 | Robinson | |
| 6,961,689 B1 | 11/2005 | Greenberg | |
| 6,970,843 B1 | 11/2005 | Forte | |
| 6,993,507 B2 | 1/2006 | Meyer | |
| 6,996,263 B2 | 2/2006 | Jones et al. | |
| 6,999,943 B1 | 2/2006 | Johnson | |
| 7,004,382 B2 | 2/2006 | Sandru | |
| 7,010,507 B1 | 3/2006 | Anderson | |
| 7,016,704 B2 | 3/2006 | Pallakoff | |
| 7,039,048 B1 | 5/2006 | Monta | |
| 7,062,456 B1 | 6/2006 | Riehl | |
| 7,062,768 B2 | 6/2006 | Kubo | |
| 7,113,925 B2 * | 9/2006 | Waserstein et al. | 705/50 |
| 7,114,649 B2 | 10/2006 | Nelson | |
| 7,139,594 B2 | 11/2006 | Nagatomo | |
| 7,140,539 B1 | 11/2006 | Crews | |
| 7,163,347 B2 | 1/2007 | Lugg | |
| 7,181,430 B1 | 2/2007 | Buchanan | |
| 7,197,173 B2 | 3/2007 | Jones et al. | |
| 7,200,255 B2 | 4/2007 | Jones | |
| 7,216,106 B1 * | 5/2007 | Buchanan et al. | 705/45 |
| 7,249,076 B1 | 7/2007 | Pendleton | |
| 7,252,224 B2 | 8/2007 | Verma | |
| 7,290,034 B2 | 10/2007 | Budd | |
| 7,299,970 B1 | 11/2007 | Ching | |
| 7,299,979 B2 | 11/2007 | Phillips | |
| 7,313,543 B1 | 12/2007 | Crane | |
| 7,321,874 B2 | 1/2008 | Dilip | |
| 7,321,875 B2 | 1/2008 | Dilip | |
| 7,325,725 B2 | 2/2008 | Foss, Jr. | |
| 7,343,320 B1 | 3/2008 | Treyz | |
| 7,349,566 B2 | 3/2008 | Jones et al. | |
| 7,377,425 B1 | 5/2008 | Ma | |
| 7,379,978 B2 | 5/2008 | Anderson | |
| 7,385,631 B2 | 6/2008 | Maeno | |
| 7,386,511 B2 | 6/2008 | Buchanan | |
| 7,391,897 B2 | 6/2008 | Jones | |
| 7,391,934 B2 | 6/2008 | Goodall et al. | |
| 7,392,935 B2 | 7/2008 | Byrne | |
| 7,401,048 B2 | 7/2008 | Rosedale | |
| 7,403,917 B1 | 7/2008 | Larsen | |

| Patent Number | Date | Name | | Publication Number | Date | Name | |
|---|---|---|---|---|---|---|---|
| 7,421,107 B2 | 9/2008 | Lugg | | 2003/0081824 A1 | 5/2003 | Mennie | |
| 7,437,327 B2 | 10/2008 | Lam | | 2003/0105688 A1 | 6/2003 | Brown | |
| 7,440,924 B2 | 10/2008 | Buchanan | | 2003/0139999 A1 | 7/2003 | Rowe | |
| 7,447,347 B2 | 11/2008 | Weber | | 2003/0167225 A1 | 9/2003 | Adams | |
| 7,455,220 B2 | 11/2008 | Phillips | | 2003/0191615 A1 | 10/2003 | Bailey et al. | |
| 7,460,108 B2 | 12/2008 | Tamura | | 2003/0191869 A1 | 10/2003 | Williams | |
| 7,461,779 B2 | 12/2008 | Ramachandran | | 2003/0200174 A1 | 10/2003 | Star | |
| 7,461,780 B2 | 12/2008 | Potts | | 2004/0010466 A1 | 1/2004 | Anderson | |
| 7,471,818 B1 | 12/2008 | Price | | 2004/0012496 A1 | 1/2004 | De Souza | |
| 7,475,040 B2 * | 1/2009 | Buchanan et al. | 705/42 | 2004/0024626 A1 | 2/2004 | Bruijning | |
| 7,477,923 B2 | 1/2009 | Wallmark | | 2004/0024708 A1 | 2/2004 | Masuda | |
| 7,480,382 B2 | 1/2009 | Dunbar | | 2004/0057697 A1 * | 3/2004 | Renzi et al. | 386/83 |
| 7,489,953 B2 | 2/2009 | Griffin | | 2004/0058705 A1 | 3/2004 | Morgan | |
| 7,490,242 B2 | 2/2009 | Torres | | 2004/0066031 A1 | 4/2004 | Wong | |
| 7,497,429 B2 | 3/2009 | Reynders | | 2004/0069841 A1 | 4/2004 | Wong | |
| 7,503,486 B2 | 3/2009 | Ahles | | 2004/0078299 A1 | 4/2004 | Down-Logan | |
| 7,506,261 B2 | 3/2009 | Satou | | 2004/0080795 A1 | 4/2004 | Bean | |
| 7,509,287 B2 | 3/2009 | Nutahara | | 2004/0093303 A1 | 5/2004 | Picciallo | |
| 7,512,564 B1 | 3/2009 | Geer | | 2004/0093305 A1 | 5/2004 | Kight | |
| 7,519,560 B2 | 4/2009 | Lam | | 2004/0103296 A1 | 5/2004 | Harp | |
| 7,520,420 B2 | 4/2009 | Phillips | | 2004/0109596 A1 | 6/2004 | Doran | |
| 7,536,354 B1 | 5/2009 | deGroeve | | 2004/0122754 A1 | 6/2004 | Stevens | |
| 7,536,440 B2 | 5/2009 | Budd | | 2004/0138974 A1 | 7/2004 | Shimamura | |
| 7,539,646 B2 * | 5/2009 | Gilder et al. | 705/44 | 2004/0148235 A1 | 7/2004 | Craig | |
| 7,542,598 B2 * | 6/2009 | Jones et al. | 382/135 | 2004/0158549 A1 | 8/2004 | Matena | |
| 7,548,641 B2 | 6/2009 | Gilson et al. | | 2004/0165096 A1 | 8/2004 | Maeno | |
| 7,571,848 B2 | 8/2009 | Cohen | | 2004/0170259 A1 | 9/2004 | Park | |
| 7,587,363 B2 | 9/2009 | Cataline | | 2004/0210515 A1 | 10/2004 | Hughes | |
| 7,599,543 B2 * | 10/2009 | Jones et al. | 382/137 | 2004/0236647 A1 | 11/2004 | Acharya | |
| 7,599,888 B2 | 10/2009 | Manfre | | 2004/0236688 A1 | 11/2004 | Bozeman | |
| 7,602,956 B2 * | 10/2009 | Jones et al. | 382/135 | 2004/0245324 A1 | 12/2004 | Chen | |
| 7,606,762 B1 * | 10/2009 | Heit | 705/39 | 2004/0252679 A1 | 12/2004 | Williams | |
| 7,609,873 B2 | 10/2009 | Foth et al. | | 2004/0260636 A1 | 12/2004 | Marceau | |
| 7,619,721 B2 * | 11/2009 | Jones et al. | 356/71 | 2004/0267666 A1 | 12/2004 | Minami | |
| 7,620,231 B2 * | 11/2009 | Jones et al. | 382/137 | 2005/0033645 A1 | 2/2005 | Duphily | |
| 7,647,275 B2 * | 1/2010 | Jones | 705/40 | 2005/0033685 A1 | 2/2005 | Reyes | |
| 7,668,363 B2 | 2/2010 | Price | | 2005/0033695 A1 | 2/2005 | Minowa | |
| 7,672,940 B2 * | 3/2010 | Viola et al. | 1/1 | 2005/0038754 A1 | 2/2005 | Geist | |
| 7,676,409 B1 | 3/2010 | Ahmad | | 2005/0044042 A1 | 2/2005 | Mendiola | |
| 7,680,735 B1 | 3/2010 | Loy | | 2005/0044577 A1 | 2/2005 | Jerding | |
| 7,689,482 B2 | 3/2010 | Lam | | 2005/0049950 A1 | 3/2005 | Johnson | |
| 7,702,588 B2 | 4/2010 | Gilder | | 2005/0075969 A1 | 4/2005 | Nielson | |
| 7,734,545 B1 | 6/2010 | Fogliano | | 2005/0078336 A1 | 4/2005 | Ferlitsch | |
| 7,743,979 B2 | 6/2010 | Fredman | | 2005/0086140 A1 | 4/2005 | Ireland | |
| 7,766,244 B1 | 8/2010 | Field | | 2005/0086168 A1 | 4/2005 | Alvarez | |
| 7,769,650 B2 | 8/2010 | Bleunven | | 2005/0091161 A1 | 4/2005 | Gustin | |
| 2001/0014881 A1 | 8/2001 | Drummond | | 2005/0096992 A1 | 5/2005 | Geisel | |
| 2001/0018739 A1 | 8/2001 | Anderson | | 2005/0097046 A1 * | 5/2005 | Singfield | 705/42 |
| 2001/0027994 A1 | 10/2001 | Hayashida | | 2005/0108164 A1 | 5/2005 | Salafia | |
| 2001/0042171 A1 | 11/2001 | Vermeulen | | 2005/0108168 A1 | 5/2005 | Halpin | |
| 2001/0043748 A1 | 11/2001 | Wesolkowski | | 2005/0131820 A1 | 6/2005 | Rodriguez | |
| 2001/0047330 A1 | 11/2001 | Gephart | | 2005/0149436 A1 | 7/2005 | Elterich | |
| 2001/0054020 A1 | 12/2001 | Barth | | 2005/0168566 A1 | 8/2005 | Tada | |
| 2002/0001393 A1 | 1/2002 | Jones | | 2005/0171899 A1 * | 8/2005 | Dunn et al. | 705/39 |
| 2002/0016763 A1 | 2/2002 | March | | 2005/0171907 A1 | 8/2005 | Lewis | |
| 2002/0032656 A1 | 3/2002 | Chen | | 2005/0177499 A1 | 8/2005 | Thomas | |
| 2002/0052841 A1 | 5/2002 | Guthrie | | 2005/0177518 A1 | 8/2005 | Brown | |
| 2002/0052853 A1 | 5/2002 | Munoz | | 2005/0182710 A1 | 8/2005 | Andersson | |
| 2002/0065786 A1 | 5/2002 | Martens | | 2005/0188306 A1 | 8/2005 | Mackenzie | |
| 2002/0072974 A1 | 6/2002 | Pugliese | | 2005/0209961 A1 | 9/2005 | Michelsen | |
| 2002/0075524 A1 | 6/2002 | Blair | | 2005/0228733 A1 | 10/2005 | Bent | |
| 2002/0084321 A1 | 7/2002 | Martens | | 2005/0252955 A1 | 11/2005 | Sugai | |
| 2002/0116329 A1 | 8/2002 | Serbetcioglu | | 2005/0267843 A1 | 12/2005 | Acharya | |
| 2002/0118891 A1 | 8/2002 | Rudd | | 2005/0269412 A1 | 12/2005 | Chiu | |
| 2002/0120562 A1 | 8/2002 | Opiela | | 2005/0278250 A1 | 12/2005 | Zair | |
| 2002/0138522 A1 | 9/2002 | Muralidhar | | 2005/0281471 A1 | 12/2005 | LeComte | |
| 2002/0147798 A1 | 10/2002 | Huang | | 2005/0289030 A1 | 12/2005 | Smith | |
| 2002/0150279 A1 | 10/2002 | Scott | | 2006/0004660 A1 | 1/2006 | Pranger | |
| 2002/0152161 A1 | 10/2002 | Aoike | | 2006/0025697 A1 | 2/2006 | Kurzweil | |
| 2002/0152164 A1 | 10/2002 | Dutta | | 2006/0039629 A1 | 2/2006 | Li | |
| 2002/0152169 A1 | 10/2002 | Dutta | | 2006/0047593 A1 | 3/2006 | Naratil | |
| 2002/0171820 A1 | 11/2002 | Okamura | | 2006/0053056 A1 | 3/2006 | Alspach-Goss | |
| 2002/0178112 A1 | 11/2002 | Goeller | | 2006/0059085 A1 | 3/2006 | Tucker | |
| 2003/0005326 A1 | 1/2003 | Flemming | | 2006/0080245 A1 | 4/2006 | Bahl | |
| 2003/0023557 A1 | 1/2003 | Moore | | 2006/0085357 A1 | 4/2006 | Pizarro | |
| 2003/0038227 A1 | 2/2003 | Sesek | | 2006/0102704 A1 | 5/2006 | Reynders | |
| 2003/0055756 A1 | 3/2003 | Allan | | 2006/0106691 A1 | 5/2006 | Sheaffer | |
| 2003/0055776 A1 | 3/2003 | Samuelson | | 2006/0106717 A1 | 5/2006 | Randle | |
| 2003/0075916 A1 | 4/2003 | Gorski | | 2006/0110063 A1 | 5/2006 | Weiss | |

| | | | |
|---|---|---|---|
| 2006/0112013 A1 | 5/2006 | Maloney | |
| 2006/0115110 A1 | 6/2006 | Rodriguez | |
| 2006/0115141 A1 | 6/2006 | Koakutsu | |
| 2006/0118613 A1 | 6/2006 | McMann | |
| 2006/0144924 A1 | 7/2006 | Stover | |
| 2006/0144950 A1 | 7/2006 | Johnson | |
| 2006/0161501 A1 | 7/2006 | Waserstein et al. | |
| 2006/0206506 A1 | 9/2006 | Fitzpatrick | |
| 2006/0214940 A1 | 9/2006 | Kinoshita | |
| 2006/0229976 A1 | 10/2006 | Jung | |
| 2006/0229986 A1 | 10/2006 | Corder | |
| 2006/0238503 A1 | 10/2006 | Smith | |
| 2006/0242062 A1 | 10/2006 | Peterson | |
| 2006/0242063 A1 | 10/2006 | Peterson | |
| 2006/0249567 A1 | 11/2006 | Byrne | |
| 2006/0279628 A1 | 12/2006 | Fleming | |
| 2006/0282383 A1 | 12/2006 | Doran | |
| 2007/0016796 A1 | 1/2007 | Singhal | |
| 2007/0019243 A1 | 1/2007 | Sato | |
| 2007/0022053 A1 | 1/2007 | Waserstein et al. | |
| 2007/0031022 A1 | 2/2007 | Frew | |
| 2007/0050292 A1 | 3/2007 | Yarbrough | |
| 2007/0058851 A1 | 3/2007 | Quine | |
| 2007/0063016 A1 | 3/2007 | Myatt | |
| 2007/0075772 A1 | 4/2007 | Kokubo | |
| 2007/0077921 A1 | 4/2007 | Hayashi | |
| 2007/0080207 A1 | 4/2007 | Williams | |
| 2007/0082700 A1 | 4/2007 | Landschaft | |
| 2007/0084911 A1 | 4/2007 | Crowell | |
| 2007/0086642 A1 | 4/2007 | Foth | |
| 2007/0086643 A1 | 4/2007 | Spier | |
| 2007/0094088 A1 | 4/2007 | Mastie | |
| 2007/0100748 A1 | 5/2007 | Dheer | |
| 2007/0129955 A1 | 6/2007 | Dalmia | |
| 2007/0136198 A1 | 6/2007 | Foth et al. | |
| 2007/0140594 A1 | 6/2007 | Franklin | |
| 2007/0143208 A1 | 6/2007 | Varga | |
| 2007/0156438 A1 | 7/2007 | Popadic et al. | |
| 2007/0168265 A1 | 7/2007 | Rosenberger | |
| 2007/0171288 A1 | 7/2007 | Inoue | |
| 2007/0194102 A1 | 8/2007 | Cohen | |
| 2007/0241179 A1 | 10/2007 | Davis | |
| 2007/0255652 A1 | 11/2007 | Tumminaro | |
| 2007/0258634 A1 | 11/2007 | Simonoff | |
| 2007/0288380 A1* | 12/2007 | Starrs | 705/45 |
| 2008/0002911 A1* | 1/2008 | Eisen et al. | 382/283 |
| 2008/0021802 A1 | 1/2008 | Pendleton | |
| 2008/0040280 A1 | 2/2008 | Davis | |
| 2008/0052182 A1 | 2/2008 | Marshall | |
| 2008/0059376 A1 | 3/2008 | Davis | |
| 2008/0063253 A1 | 3/2008 | Wood | |
| 2008/0071721 A1 | 3/2008 | Wang | |
| 2008/0080760 A1 | 4/2008 | Ronca | |
| 2008/0086421 A1 | 4/2008 | Gilder | |
| 2008/0103790 A1 | 5/2008 | Abernethy | |
| 2008/0117991 A1 | 5/2008 | Peddireddy | |
| 2008/0119178 A1 | 5/2008 | Peddireddy | |
| 2008/0133411 A1 | 6/2008 | Jones et al. | |
| 2008/0147549 A1 | 6/2008 | Ruthbun | |
| 2008/0156438 A1 | 7/2008 | Stumphauzer | |
| 2008/0219543 A1 | 9/2008 | Csulits | |
| 2008/0247629 A1 | 10/2008 | Gilder | |
| 2008/0249931 A1 | 10/2008 | Gilder | |
| 2008/0262953 A1 | 10/2008 | Anderson | |
| 2009/0108080 A1 | 4/2009 | Meyer | |
| 2009/0141962 A1 | 6/2009 | Borgia | |
| 2009/0171819 A1 | 7/2009 | Von der Emde et al. | |
| 2009/0171825 A1* | 7/2009 | Roman | 705/35 |
| 2009/0173781 A1 | 7/2009 | Ramachandran | |
| 2009/0190823 A1 | 7/2009 | Walters | |
| 2009/0252437 A1 | 10/2009 | Li | |
| 2009/0281904 A1 | 11/2009 | Pharris | |
| 2009/0313167 A1 | 12/2009 | Dujari | |
| 2010/0007899 A1 | 1/2010 | Lay | |

OTHER PUBLICATIONS

Century Remote Deposit High-Speed Scanner User's Manual Release, 2006(Century Manual).*
NetDeposit Awarded Two Patents for Electronic Check Process, Jun. 18, 2007 (NetDeposit).*
White, J.M. et ai, "ImageThreshoulding for Optical Character Recognition and Other Applications Requiring Character Image Extraction", IBM J. Res. Develop, 1983, vol. 27.
Ritzer, J.R. "Hinky Dinky helped spearhead POS, remote banking movement", Bank System & Equipment, vol. 21, No. 12 pp. 51-54, Dec. 1984.
Dinan, R.F. Dinan et al, "ImagePlus High Performance Transaction System", IBM System Journal; 1990, pp. 431-434; vol. 29, No. 3.
Gupta, Amar et al., "An Integrated Architecture for Recognition of Totally Unconstrained Handwritten Numerals"; International Journal of Pattern Recognition and Artificial Intelligence; 1993, pp. 757-773; vol. 7, No. 4.
Masonson, L. "Check truncation and ACH trends—automated clearing houses," healthcare financial management association, http://WWN.findarticles.com/p/articles/mLm3276/is_n7_v47/ai_14466034/print, 1993.
Zhang, C.Y., "Robust Estimation and Image Combining," Astronomical Data Analysis Software and Systems IV, ASP Conference Series, 1995.
Kornai Andras et al, "Recognition of Cursive Writing on Personal Checks," Proceedings of International Workshop on the Frontiers in Handwriting Recognition, Sep. 1996, pp. 1-6.
De Queiroz, Ricardo et al, "Mixed RasterContent (MRC) Model for Compound Image Compression", pp. 1-12.
Rivlin, Alice M. et al, Chair, Vice Chair—Board of Governors, Committee on the Federal Reserve in the Payments Mechanisrn—Federal Reserve System, "The Federal Reserve in the Payments Mechanism", Jan. 1998.
Anderson, Milton M. "FSML and Echeck", Financial Services Technology Consortium, 1999.
"Full Service Direct Deposit," www.nonprofitstaffing.com/images/upload/dirdepform.pdf, 2001.
Craig, Ben; "Resisting Electronic Payment Systems: Burning Down the House?", Federal Reserve Bank of Cleveland, Jul. 1999.
Rose, Sarah et al., "Best of the Web": The Top 50 Financial Websites. Money, New York Dec. 1999, vol. 28, iss12; pp. 178-187.
Furst, Karen et al., "Internet Banking: Developments and Prospects", Office of the Comptroller of the Currency— Economic and Policy Analysis Working Paper 2000-9,Sep. 2000.
Middleware', URL: http://www.cs.umanitoba.ca/maheswar/anc2002/PAPERS/bak01.pdf, Jun. 24, 2008.
Palacios, Rafael et al, "Automatic Processing of Brazilian Bank Checks", Machine Vision and Applications; 2002, pp. 1-28.
Peter, J. Wallison, "Wal-Mart Case Exposes Flaws in Banking-Commerce Split", American Banker, vol. 167. No. 8, Jan. 17, 2002.
Heckenberg, D., "Using Mac OSX for Real-Time Image Processing," 2003.
Burnett, J., "Depository Bank Endorsement Requirements," Bankersonline.com, http://www.bankersonline.com/cgi-ban/printview.pl, 2003.
Blafore, Bonnie, "Lower Commissions, Fewer Amenities." Better Investing. Madison Heights: Feb. 2003, vol. 52, iss 6; pp. 50-51.
"Direct Deposit Authorization Form" www.umass.edu/humres/library/DDForm.pdf, 2003.
Electronic Billing Problem: The E-check is in the mail-American Banker-v168, n. 95, 91, May 2003.
Oxley, Michael G., from committee on Financial Services; "Check Clearing for the 21st Century Act", 108th Congress—1st session, House of Representatives, report 108-132, Jun. 2, 2003, pp. 1-20.
Shelby, Hon. Richard C. (Chairman, Committee on Baking, Housing and Urban Affairs); "Check Truncation Act of 2003", calendar No. 168, 108th Congress, 1st Session Senate report 108-79, Jun. 25, 2003.
Knestout, Brian P. et al., "Banking Made Easy" Kiplinger's Personal Fiance, Washington :Jul. 2003, vol. 57 iss 7; pp. 44-47.
Oxley, Michael G, from the committee of conference; "Check Clearing For The 21st Century Act", 108th Congress—1st Sessi9n, House of Representatives, Report 108-291 , Oct. 1, 2003, pp. 1-27.
Public Law 108-100—108th Congress; "An Act-Check Clearing For The 21st Century Act". Oct. 28, 2003, [H. R. 1474], 117 STAT. 1177, 12 USC 5001.

Johnson, Jennifer J., Secretary of Board; Federal Reserve System, 12 CFR Part 229, Regulation CC; "Availability of Funds and Collection of Checks", 2009, pp. 1-89.

Mohl, Bruce, "Banks Reimbursing ATM Fee to Compete With Larger Rivals." Boston Globe, Boston, MA., Sep. 2004, pp. 1E.

The Automated Clearinghouse, "Retail Payment Systems; Payment Instruments, Clearing and Settlement; The Automated Clearinghouse (ACH)," www.ffiec.gov/ffiecinfobase/booklets/retailretail_02d.html, Dec. 2005.

"Two Words Every Business Should Know: Remote Deposit," Canon, http://www.rpsolutions.com/rpweb/pdfs/ canon_rdc.pdf, 2005.

Wells Fargo 2005 News Releases, "The New Wells Fargo Electronic Deposit Services Break Through Banking Boundaries In The Age of Check 21", San Francisco Mar. 28, 2005, wwwwellsfargo.com/press/3282005_check21?year=2005.

Constanzo, Chris "Remote Check Deposit: Wells Captures A New Checking Twist", Bank Technology News Article— May 2005. www.americanbanker.com/btn_article.html?id=20050502YQ50FSG>.

Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universitat des Saari andes, Saarbrucken, im Jul. 2005.

Credit Union Journal, "AFCU Averaging 80 DepositHome Transactions Per Day", Credit Union Journal, Aug. 15, 2005.

"Federal Check 21 Act, New Check 21 Act effective Oct. 28, 2004: Bank No Longer Will Return Original Cancelled Checks," Consumer Union's FAQ's and Congressional Testimony on check 21, www.consumerlaw.orglinitiateslcontentlcheck21—content.html.

BankServ, "depositNow: What's the difference?", 2006, DepositNow. http://www.bankserv.com/products/remoteddeposithtm, 2006, Bankserv.

Blue Mountain Consulting, from URL: www.bluemountainconsulting.com. Apr. 26, 2006.

Remotedepositcapture, URL: www.remotedepositcapture.com, 2006.

Onlinecheck.com/Merchant Advisors, "real-Time Check Debit", Merchant Advisors: Retail Check Processing Check Conversion, http://www.onlinecheck/wach/rcareal.htm, 2006.

"Compliance with Regulation CC," http://www/federalreserve.org/Pubsregccregcc.htm, Jan. 24, 2006, 6 pgs.

Chiang, Chuck Chiang, The Bulletin, "Remote banking offered", Feb. 1, 2006, http://bendbulietin.com/apps/pbcs.dll/article? AID=/20060201/BIZ01 02/60201 0327&rtempi....

Federal Reserve Board, "Check Clearing for the 21st Century Act," FRB, http://www.federalreserve.gov/paymentsystems/turncation/, 2006.

Fest, G., "Patently Unaware," Bank Technology News, 412006, Retrieved from the internet at URL: http://banktechnews.com/article.html?id=20060403T7612618.

Bank Systems & Technology, Untitled Article, 5/112006, http://www.banktech.com/showarticle.jhtml? articleID=187003126>, pp. 1-4, Copyright 2004-2005 CMP Media, LLC.

Digital Transactions News, "An ACH-Image Proposal for Check Roils Banks and Networks", May 26, 2006.

BankServ Press release, "BankServ Announces New Remote Deposit Product Integrated With QuickBooks", San Francisco, Jul. 6, 2006, Remotedepositcapture.com, pp. 1-3.

Remote Deposit Capture News Article, "PNC Bank to Offer Ease of Online Deposit Service Integrated with QuickBooks to Small Businesses", Remote Deposit Capture News Articles from 7/2412006, remotedepositcapture.com, pp. 1-2.

Dias, Danilo et al, "A Model for the Electronic Representation of Bank Checks", Universidade de Brasilia.

"Check Fraud: A Guide to Avoiding Losses," All Net, http://all.netlbooks/auditlcheckfraud/security.htm, 2007.

"What is check Fraud," National Check Fraud Center, http://www.ckfraud.org/ckfraud.html, 2007.

"Remote Deposit," National City, http://www.nationalcity.com/smallbusiness/cashmanagementlremotedeposit ldefault.asp, 2007.

"Remote Deposit Capture," Plante & Moran, http://plantemoran.comlindustries/financialinstitutions/banklresourceslcommunity+bank+advisor/2007+summer+issue/remote+deposit+capture.htm, 2007.

"Virtual Bank Checks," Morebusiness.com, http://www.morebusiness.com/running_your_business/businessbitsld908484987.brc, 2007.

Canon, "ImageFormula CR-25, Improve Your Bottom Line With Front-Line Efficiencies", 0117W117, 1207-55/25-1 OM-BSP, 2007.

"It's the easiest way to switch banks," LNB, http://www.inbky.com/pdf/LNBswitch-kit10-07.pdf, 2007.

"Lesson 38—More Bank Transactions," Turtle Soft, http://www,turtlesoft.com/goldenseal-software-manual/lesson38. htm, 2007.

"Personal Finance," PNC, http://www.pnc.comlwebapp/unsec/productsandservice.do?sitearea=/PNC/home/personall account+services/quick+switch/quick+switch+faqs, 2007.

"Switching Made Easy," Bank of North Georgia, http://www.banknorthgeorgia.com/cmsmaster/documents/286/documents616.pdf, 2007.

"Chapter 7 Payroll Programs," Uniform staff Payroll System, http://www2.oecn.k12.oh.us/www/ssd1/usps/usps_user_guide_005.html, 2007.

"Check 21 Solutions," Columbia Financial International, Inc. http://www.columbiafinanical.us/check21-solutions.htm, 2007.

"Direct Deposit", University of Washington, http://www.washington.edu/admin/payroll/directdeposit.html, 2007.

"Accept "Customer Not Present" Checks," Accept Check Online, http://checksoftware.com/, 2007.

"Customer Personalized Bank Checks and Address Lables" Checks Your Way, Inc., http://www.checksyourway.com/htm/web_pages/faq.htm, 2007.

"Direct Deposit Application for Payroll," Purdue, http://purdue.edu/payroll/pdf/directdepositapplication.pdf, 2007.

"Frequently Asked Questions," Bank of America, http://www.bankofamerica,com/deposits/checksave/index.cfm?template=1c_faq_bymail, 2007.

"Refractive index" wikipedia, the free encyclopedia; http://en.wikipedia.org/wiki/refractivejndex.

Patterson, Scott, "USAA Deposit@Home—Another WOW moment for Net Banking", NextCU.com, 2007.

Remotedepositcapture.com, LLC, "Remote Deposit Capture Overview," ROC Overview, http://remotedepositcapture.com/overview/RDC_overview.htm, Mar. 12, 2007.

Board of Governors of the federal reserve System, "Report to Congress on the Check Clearing for the 21 st Century Act of 2003" Apr. 2007, Submitted to the Congress pursuant to section 16 of the Check Clearing for the 21 st Century Act of 2003.

Image Master, "Photo Restoration: We specialize in digital photo restration and photograp repair of family pictures", http://www.imphotorepair.com, downloaded Apr. 2007.

"Save on ATM Fees", Chicago Tribune, Chicago, IL., Jul. 2007.

Association of German Banks, SEPA 2008: Uniform Payment Instruments For Europe, Berlin, Jul. 2007, Bundesverband deutscher banker eV.

Creativepaymentsolutions.com, "Creative Payment Solutions—Websolutions", www.creativepaymentsolution.com/cps/financiaLservices/websolution/default.html, copyright 2008, Creative Payment Solutions, Inc.

"How to Digitally Deposit a Check Image", Smart Money Daily, downloaded 2008.

DCU Member'S Monthly—Jan. 2008, "PC Deposit—Deposit Checks from Home!", http://www.mycreditunionnewsletter.com/dcu/01 08/pagel.html, pp. 1-2, copyright 2008 Digital Federal Credit Union.

"PC Deposit: Deposit Checks From Home!", Digital federal Credit Union, 2008.

Mitek Systems: Mitek Systems Launches First Mobile Check Deposit and Bill Pay Application, Jan. 22, 2008, San Diego, CA.

Windowsfordevices.com, "Software lets camera phone users deposit checks, pay bills", Jan. 29, 2008, www.windowsfordevices.com/news/NS3934956670.html.

Bruene, Jim; "Check Free to Enable In-Home Remote Check Deposit for Consumers and Small Business", NetBanker.com, Feb. 5, 2008, http://www.netbanker.com/2008/02/checkfree_to_enable_inhome_rem.html, 1995-2007, Financial Insite, Inc.

CNN.comltechnology, "Scan, deposit checks from home", Feb. 7, 2008, www.cnn.com/2008ITECH/biztech/02/07/check. scanning.ap/index.html.

"WallStreetGrapevine.com" stocks on the rise: JADG, BKYI, MITK; M2 presswire, Coventry: Mar. 3, 2008.

The Green Sheet 2.0: Newswire, "CO-OP adds home deposit capabilities to suite of check imaging products", www.greensheet.com/newswire.php?newswire_id=8799., 2009, pp. 1-2.

Matthews, Deborah, "Advanced Technology Makes Remote Deposit Capture Less Risky", Indiana Bankers Association, Apr. 2008.

Bruene, Jim; "Digital Credit Union and Four Others Offer Consumer Remote Deposit Capture through EasCorp", NetBanker—Tracking Online Finance, Apr. 13, 2008, www.netbanker.com/2008/04/digitaUederal_credit_union_a.html, 1995-2007, FinancialInsite, Inc.

Credit Union Journal, "The Ramifications of Remote Deposit Capture Success", Credit Union Journal—Apr. 14, 2008, www.cujournaL.com/printthis.html?id=20080411 EODZT57G.

Wells Fargo Commercial, "Remote Deposit", www.wellsfargo.com/com/treasury_mgmtlreceivables/electronic/remote_deposit, 1999-2008, Wells Fargo.

Online deposit: faq, http://www.depositnow.com/faq.html Aug. 26, 2008.

"Adjusting Brightness and Contrast", www.eaglesoftware.com.

Mitek systems, Imagenet Mobile Deposit', San Diego, CA 2 Pages.

Fisher, Dan M "Home Banking in the 21st century: Remote capture Has Gone Retail", 4 pages.

Affinity Federal Credit Union, "Affinity announces online deposit," Aug. 4, 2005, Affinity Federal Credit Union.

"Check 21—The check is not in the post", RedTitan Technology 2004./http://www.redtitan.com/check21/htm, 3 pgs[7].

Hartly, Thomas, "Banks Check Out New Image", Business First, Buffalo: Jul. 16, 2004, vol. 20, Iss 43, p. 1, 3 pages[7].

Wade, Will, "early Notes: Updating Consumers on Check 21" American Banker Aug. 10, 2004 (3 pages)[7].

"Middleware". [Retrieved on Jun. 24, 2008], Retrieved from the Internet <URL: http://www.cs.umanitoba.ca/~maheswar/anc2002/PAPERS/Bak01.pdf>.

Adam J Levitin, Remote Deposit Capture: A Legal and Transactional Overview, Banking Law Journal, p. 115 2009 (RDC).

* cited by examiner

US 7,974,899 B1

ATOMIC DEPOSIT TRANSACTION

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/242,063, and U.S. patent application Ser. No. 12/242,152, each filed on Sep. 30, 2008 and each entitled "Atomic Deposit Transaction."

BACKGROUND

Currently, a user may electronically deposit a check in a financial services institution using scanning and imaging techniques. Conventionally, the user uploads an image of the check to the financial services institution where it gets stored in storage. An advisory is sent to the user from the financial services institution confirming that the image was uploaded successfully. The user responds to the advisory, which in turn activates an image processing servlet at the financial services institution which processes the image to deposit the check into an account specified by the user.

However, if the user drops off from the transaction after they submit the image for upload but before responding to the advisory that the image was uploaded successfully, the image processing servlet does not get executed and thus the deposit is not performed. The user may drop off from transaction for a variety of reasons, such as due to a lost connection, moving to another web page if electronically depositing via a website of the financial services institution, etc.

Thus, incomplete deposit transactions via a web page may occur if the user navigates away from the web page too quickly after clicking a "submit" button (where the user is submitting an image of a check for electronic deposit to a financial services institution via a web page of the financial services institution). An incomplete transaction may occur because transaction processing may still require client side processing involving the user. Additionally, the user may not know that the deposit was not completed.

SUMMARY

A user may generate a digital image of a negotiable instrument such as a check. The digital image may be transmitted to an institution in a digital image file for deposit of the check. After the user selects to submit the digital image file, the digital image file may be sent from a user computing device to the institution. The user computing device may be decoupled from the transaction once the submission of the digital image file for deposit of the check is made. The transaction is thereafter managed by the institution. Incomplete transactions are avoided by moving the transaction processing to the server side at the institution after the user submits the digital image file.

In an implementation, the digital image file may be provided from the user computing device to the institution via a website associated with the institution.

In an implementation, the user may be provided with access to the institution (e.g., via a link to a website) to view transaction details.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
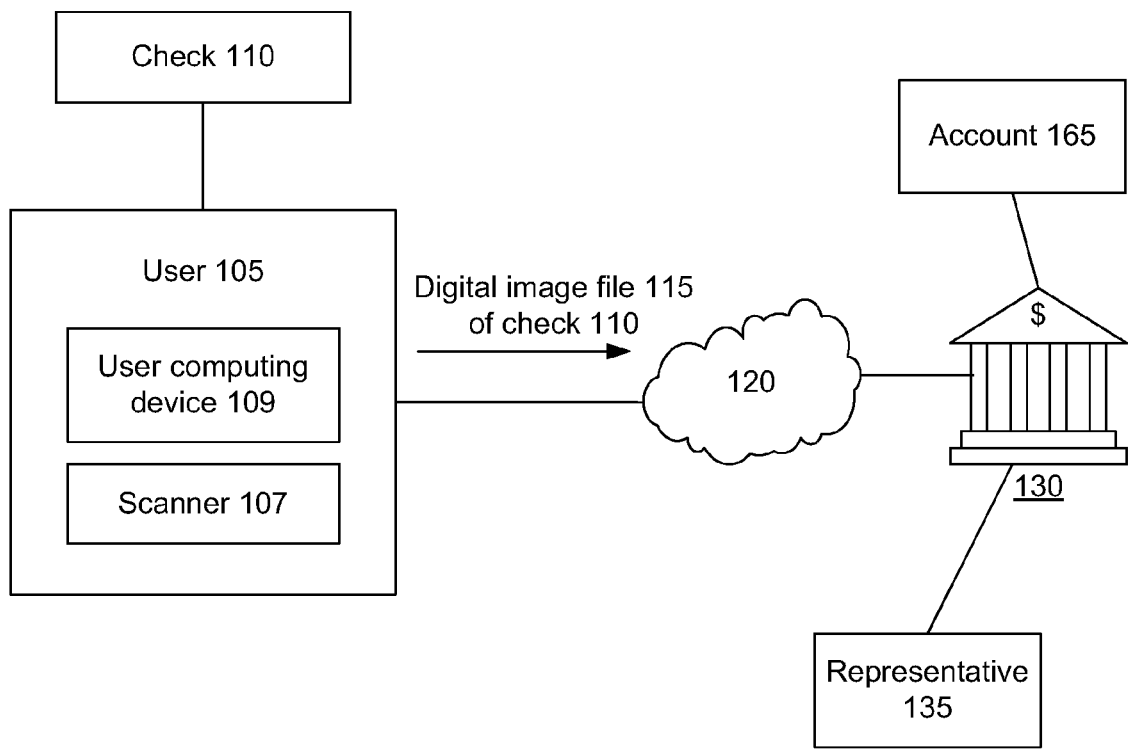
FIG. 1 is a block diagram of an implementation of a system in which example embodiments and aspects may be implemented.

FIG. 1 is a block diagram of an implementation of a system 100 in which example embodiments and aspects may be implemented. The system 100 may include a user 105 and an institution 130, which may be any type of entity capable of processing checks and/or providing funds associated with checks. For example, the institution 130 may be a financial services institution such as a retail bank, an investment bank, an investment company, a regional branch of the Federal Reserve, a clearinghouse bank and/or a correspondent bank. A representative 135 of the institution 130 may provide assistance as described further herein.

The user 105 may be an individual or entity who owns an account 165 that may be held at the institution 130. The account 165 may be any type of account for depositing funds, such as a savings account, a checking account, a brokerage account, and the like. Although only one account 165 is shown, it is contemplated that the user 105 may have any number of accounts held at the institution 130. The user 105 may deposit a check 110 in the account 165 at the institution 130 either electronically or physically. The institution 130 may process and/or clear the check 110.

The user 105 may communicate with the institution 130 by way of a communications network 120 such as an intranet, the Internet, a local area network (LAN), a wide area network (WAN), a public switched telephone network (PSTN), a cellular network, a voice over Internet protocol (VoIP) network, and the like. The user 105 may also communicate with the institution 130 by phone, email, instant messaging, text messaging, facsimile, postal mail, and the like.

As described further herein, the user 105 may electronically deposit the check 110 at the institution 130. It is noted that although examples and implementations described herein may refer to a check, the techniques and systems described herein are contemplated for, and may be used for, deposit of any negotiable instrument, such as a money order, a cashier's check, a check guaranteed by a bank, or the like.

The user 105 may access the institution 130 by opening a communication pathway via the communications network 120 using a user computing device 109. There may be several ways in which the communication pathway may be established, including, but not limited to, an Internet connection via a website of the institution 130. The user 105 may access the website and log into the website using credentials, such as, but not limited to, a username and a password.

The user 105 may use a scanner 107 to generate a digital image (also referred to herein as an "image") of the check 110. The digital image may be used to create a digital image file 115 that may be sent to the institution 130 and used by the institution 130 to process a deposit of the check 110. In an implementation, the digital image file 115 may be augmented by secondary data which may be information relating to the deposit of the check 110, such as an account number and a deposit amount, for example.

For example, after endorsing the check 110, the user 105 may use a device such as the scanner 107 and/or the user computing device 109 for example, to convert the check 110 into a digital image file 115 (also referred to herein as an "image file") by making a digital image of the front side and/or back side of the check 110 and storing the digital image(s) in a digital image file 115. In an implementation, the scanner 107 may take an image of the front of the check 110. Alternatively, the scanner 107 may take an image of both the front and the back of the check 110. The back of the check 110 may provide endorsement verification, such as the signature of the person or party the check is made out to. This may also include stamps, such as checks received at a merchant.

The digital image(s) of the check 110 may be transmitted to the institution 130 in the digital image file 115. In an implementation, the user 105 may access a website associated with the institution 130 and choose to submit the digital image file 115. After the user 105 selects to submit the digital image file 115, the digital image file 115 may be streamed or otherwise provided from the user computing device 109 to the institution 130 (e.g., using an image upload component at the user computing device 109 streaming to a servlet at the institution 130).

The user computing device 109 may be decoupled from the transaction once the submission of the digital image file 115 for deposit of the check 110 is made. The transaction is thereafter managed by the institution 130. Incomplete transactions are avoided by moving the transaction processing to the server side at the institution 130 after the user 105 submits the digital image file 115. This may be referred to as an atomic deposit transaction. Any loss or severing of a communications connection between the user computing device 109 and the institution 130, such as due to browser navigation away from a web page or website of the institution 130, communication failures, user logouts, etc. on the user side, will not affect the processing and the deposit of the check 110 in the digital image file 115. Thus, the transaction will not be left in an orphaned state.

The user 105 may send the digital image file 115 and any secondary data to the institution 130 along with a request to deposit the check 110 into an account, such as the account 165. The institution 130 may process the deposit request according to the digital image file 115 and any secondary data.

Any image processing technology may be used to retrieve the digital image(s) of the check 110 from the digital image file 115. Upon receipt and processing of the digital image file 115 and approval of the information pertaining to the check 110, the institution 130 may credit the funds of the check 110 to the account 165.

The user 105 may be provided with a link (e.g., in an email, on a website, etc.) that allows the user to view past transactions. In this manner, the user 105 may determine if the transaction was successful (e.g., whether the digital image file 115 was successfully received and processed at the institution 130, whether the check 110 was processed and funds were deposited in the account 165, etc.). Additionally, the institution 130 may provide status information and/or confirmation of the success of the transaction to the user 105 via email, facsimile, instant messaging, text messaging, phone, mail, etc.

Any technique for sending the digital image file 115 to the institution 130 may be used, such as providing the digital image file 115 from storage to a website associated with the institution 130. In an implementation, the user 105 may attach the digital image file 115 to an email and send the digital image file 115 to the institution 130 using the same device used to make the digital image(s) of the check 110 or another computing device.

The user computing device 109 may be integral with the device used to make the digital image(s) and/or the digital image file 115 or separate from the device used to make the digital image(s) and/or the digital image file 115. An example user computing device 109 is described with respect to FIG. 7. It is contemplated that any device that is capable of generating a digital image may be used to make one or more digital images of the check 110 which may be sent to the institution 130 as a digital image file 115. Additional devices that may be used in the generation and/or transmission of a digital image file 115 include a digital camera, a photocopier, a fax machine, and the like, for example.

The institution 130 may receive the digital image file 115 representing the check 110 and may use any known image processing software or other application(s) to obtain the relevant data of the check 110 from the digital image file 115. The institution 130 may determine whether the financial information associated with the check 110 may be valid.

For example, the institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image file 115 from the user 105.

The electronic devices may receive the digital image file 115 and may perform an analysis on the quality of the image(s) of the check 110 in the digital image file 115, the readability of the data contained therein, or the like. For example, the electronic devices may determine whether the image(s) may be retrieved and combined and whether the amount payable and other information may be readable such that it may be obtained and processed by the institution 130 to credit the account 165 associated with the user 105.

The institution 130, in an implementation, after receiving the digital image(s) of the check 110 from the user 105, may use a clearinghouse to perform the check clearing operations.

Check clearing operations are used by banks to do the final settlement of the check, such as removing funds from the account of the payor and transferring those funds to the user's bank.

Figure 2:
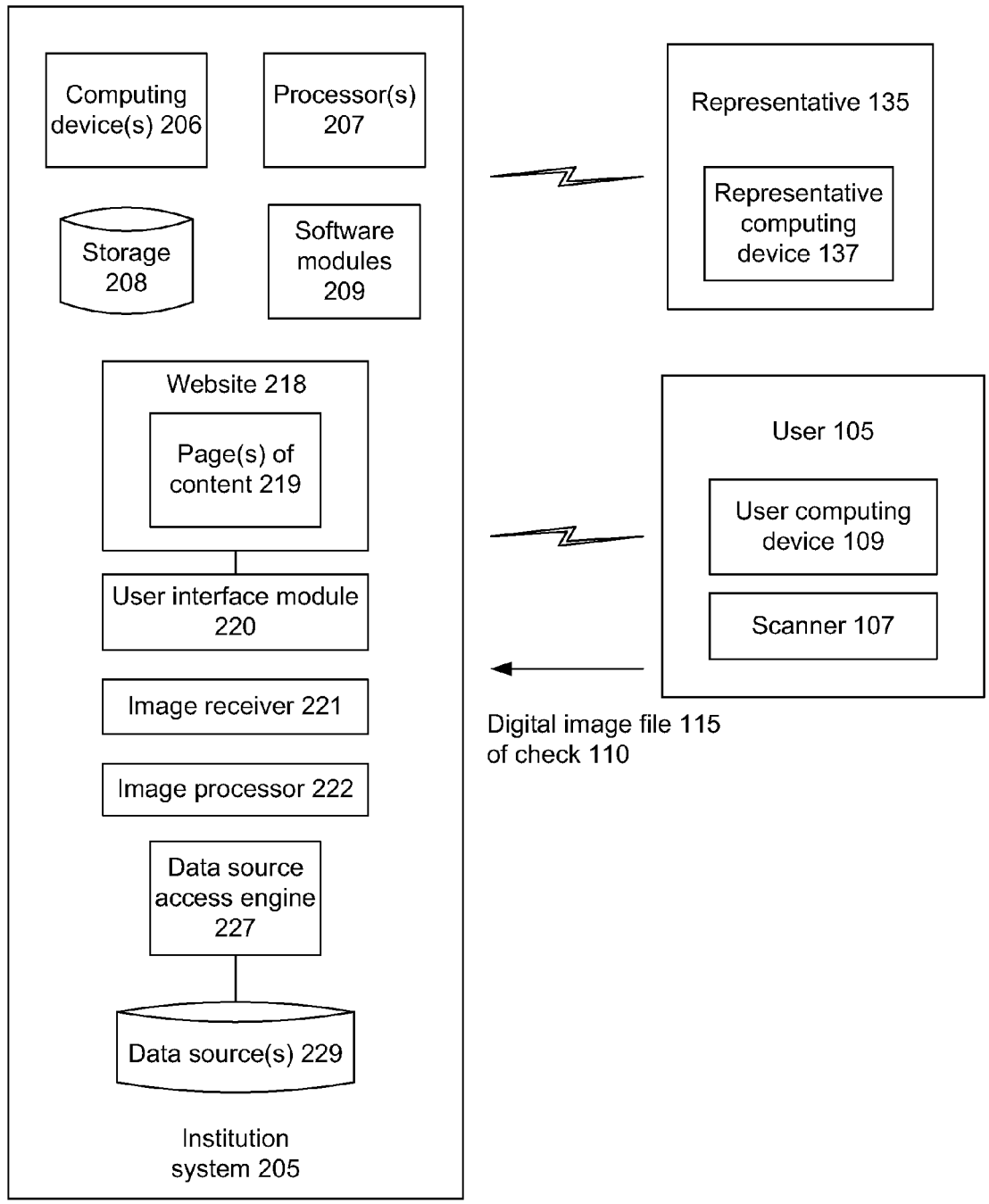
FIG. 2 is a block diagram of an implementation of a system that may be used for the deposit of a negotiable instrument.

FIG. 2 is a block diagram of an implementation of a system that may be used for the deposit of a negotiable instrument. An institution system 205 may be associated with the institution 130 and may include a user interface module 220, an image receiver 221, an image processor 222, and a data source access engine 227. The user interface module 220 may generate and format one or more pages of content 219 as a unified graphical presentation that may be provided to the user computing device 109 or a representative computing device 137. In an implementation, the page(s) of content 219 may be provided to the user computing device 109 and/or the representative computing device 137 via a secure website 218 associated with the institution system 205.

In an implementation, the institution system 205 may use the image receiver 221 to receive the digital image file 115 of a negotiable instrument, such as the check 110, from the user 105. The image receiver 221 may receive the digital image file 115 via streaming or other communications techniques.

In an implementation, the image processor 222 may receive the digital image file 115 from the image receiver 221 or storage and may process the digital image file 115 in the processing and/or clearing of the check 110. The image processor 222 may process multiple digital images if the digital image file 115 comprises multiple digital images. For example, after receiving the digital image file 115 of the check 110, the image processor 222 may retrieve the image(s) of the check 110 using any known image processing software or other application(s) to obtain any relevant data of the check 110 from the digital image file 115.

The image processor 222 has access to data, files, and documents pertaining to the user 105 as well as any other data, files, and documents that are internal or external to the institution system 205 that may be useful in processing the digital image file 115 and/or the data contained therein.

The institution system 205 has the ability to retrieve information from one or more data sources 229 via the data source access engine 227. Data pertaining to the user 105 and/or the user account 165 and/or processing and clearing of the check 110 may be retrieved from data source(s) 229 and/or external data sources. The retrieved data may be stored centrally, perhaps in storage 208. Other information may be provided to the institution system 205 from the user 105 and/or the representative 135.

Data source(s) 229 may contain data, metadata, email, files, and/or documents that the institution system 205 maintains pertaining to the user 105, such as personal data such as name, physical address, email address, etc. and financial data such as credit card numbers and checking account numbers. Such data may be useful for processing the digital image file 115 as described herein. Additionally or alternatively, the institution system 205 may access this information when processing or clearing the check 110.

The representative computing device 137 may provide access to a system which is coupled to the institution system 205. A system may be configured to format and transmit a graphical user interface to the representative 135, and through the graphical user interface provide the representative 135 the ability to interact with information that may be maintained, requested, and/or provided by the institution system 205. As mentioned above, the institution system 205 may provide a unified graphical presentation output. In an implementation, the unified graphical presentation is combined with other materials and transmitted to the representative 135.

A user access system may be implemented as a web server in an implementation. The user access system, through the use of any suitable interactive web technology, provides an interactive experience to the user 105 and/or the representative 135 through which access to check processing and clearing data and status and related data can be accomplished. Any technology that provides interactivity through a web browser is considered to be within the scope of the present discussion and may include, without limitation, Java applet, Hyper-Text Mark-Up Language (HTML), Dynamic HTML (DHTML), JavaScript, and Ajax.

The institution system 205 may comprise one or more computing devices 206. The computing device(s) 206 may have one or more processors 207, storage 208 (e.g., storage devices, memory, etc.), and software modules 209. The computing device(s) 206, including processor(s) 207, storage 208, and software modules 209, may be used in the performance of the techniques and operations described herein.

Examples of software modules 209 may include modules that may be used in conjunction with receiving and processing a digital image file 115 comprising one or more digital images of the check 110 without further interaction or instructions from the user 105 or the user computing device 109, retrieving data from the digital image file 115, generating web page content for display, receiving instructions from the representative 135 or the user 105, and providing status information and deposit confirmation to the user 105, for example. While specific functionality is described herein as occurring with respect to specific modules, the functionality may likewise be performed by more, fewer, or other modules. An example computing device and its components are described in more detail with respect to FIG. 7. It will be appreciated that the examples herein are for purposes of illustration and explanation only, and that an embodiment is not limited to such examples.

Figure 3:
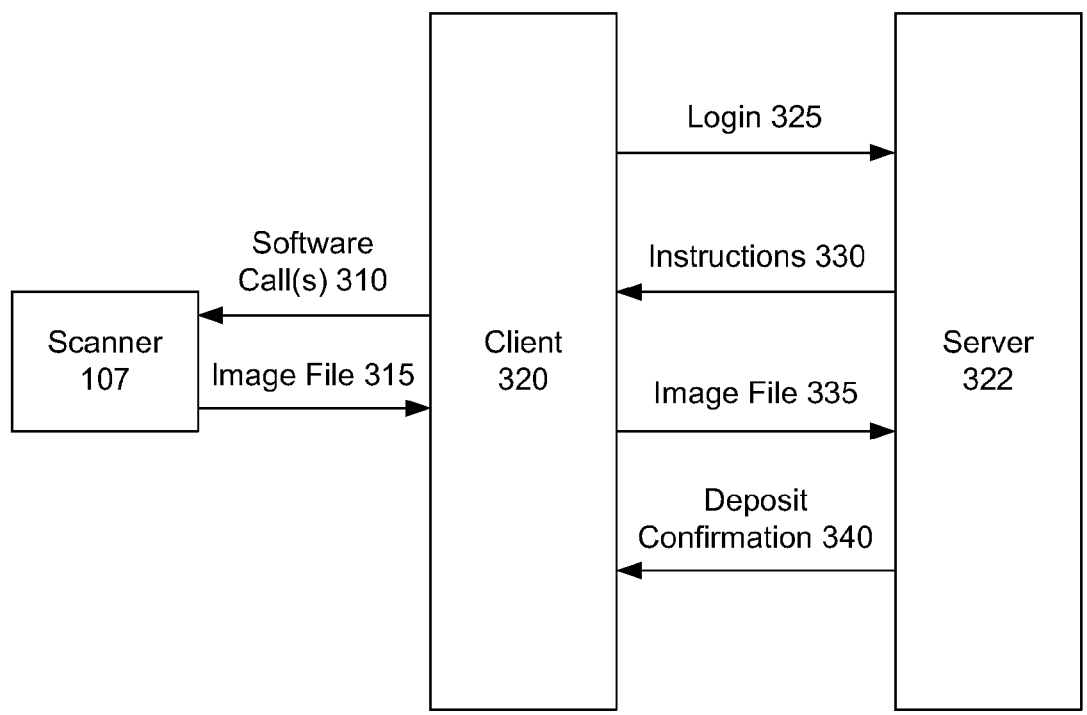
FIG. 3 shows a data-flow diagram of a system for the deposit of a negotiable instrument, in accordance with an example embodiment.

FIG. 3 shows a data-flow diagram of a system 300 for the deposit of a negotiable instrument, in accordance with an example embodiment. In the data-flow diagram, a client 320 is one example of the user computing device 109 of the user 105 described with respect to the system 100 of FIG. 1. In an implementation, a server 322 may be a software component operable by the institution 130.

The client 320 may login 325 to a remote deposit system executed on the server 322. The login 325 may serve to authenticate the user 105 as an authorized consumer of the institution 130.

The server 322, in one example, may send instructions 330 to the client 320 which execute an application on the client 320. This may include instructions which cause a software object, which may have been previously downloaded and installed on the client 320, to be executed on the client 320. In another example, the instructions 330 may include a wholly self-contained application which when delivered to the client 320 will execute and perform one or more operations described herein.

In either example, the software object may be configured to make one or more software calls 310 to the scanner 107 (or other imaging device) associated with the user computing device 109. This may be through specific software instructions to the scanner 107. In other words, the scanner's functionality may not be abstracted through any software library. In such an example, software code may be written and delivered to every different scanner.

In an alternate example, the software object may operate through a software abstraction layer, such as an application programming interface (API). The software object developer may only insert code into the software object to call one or more APIs exposed by the software operating the user computing device 109.

The software object may cause the scanner 107 to take a picture or capture one or more images of the check 110 that is being deposited. These images may be captured sequentially, e.g., pursuant to the user 105 flipping the check 110 over after an image of the front of the check 110 has been captured. However, each side of the check 110 may be captured by the scanner 107 using similar API calls. The images may be stored in an image file 315.

Once the images of one or both sides of the check 110 are captured by the scanner 107, the image file 315 may be operated on by the software object of the client 320. These operations may include any of the following: deskewing, dewarping, magnetic ink character recognition (MICR), cropping (either automatically, or having the user 105 manually identify the corners and/or edges of the check 110 for example), reducing the resolution of the image, number detection, character recognition, and the like.

One or more software objects on the client 320 may operate by performing one or more of the operations described herein and then transmitting an image file 335 (e.g., based on image file 315 that has been processed) to the server 322 after the user 105 submits that they do wish to deposit the check 110. Alternatively, the software object(s) may capture the image(s) of the check 110 and transmit the image(s) to the server 322 which in turn may perform those operations and verify that the image quality is within acceptable thresholds. In this example, the image(s) transmitted to the server 322 may be in any format, such as Joint Photographic Experts Group (JPEG) or tabbed image file format (TIFF), insofar as the server software has the ability to convert the image(s) into a Check 21 compliant format. Alternatively, the server 322 may output an X9.37 file to the clearing system. The Check Clearing for the 21st Century Act (or Check 21 Act) is a United States federal law that allows the recipient of a paper check to create a digital version, thereby eliminating the need for further handling of the physical document. The Check 21 standard for electronic exchange is defined in the standard DSTU X9.37-2003 ("X9.37").

In an implementation, on the server side, more operations may be performed, such as signature verification. However, the present discussion is not limited in any way by discussion of where certain operations are described as operating. The operations of detecting and verifying information may be performed by the client 320 before the information is transmitted along with the image(s) in the image file 335 to the server 322. Alternatively, the software object operating on the user computing device 109 may perform no operation other then capturing images of the front and back of the check 110 and transmitting those images to the server 322, wherein the server 322 performs processing and deposit of the check without any further instructions or interactions with the client 320 after receiving the image(s) from the client 320.

In an implementation, after the server 322 has received the image file 335, the client 320 may be decoupled from the transaction such that the server 322 manages the transaction and no further instructions or information is received or requested from the client 320 prior to processing and deposit of the check. The server 322 may retrieve the image(s) of the check from the image file 335 and process the check for deposit into an account of the user. Such an atomic deposit transaction avoids an incomplete transaction which may have otherwise occurred due to a subsequent communication problem between the client 320 and the server 322. At some point, the server 322 may provide a deposit confirmation 340 to the user, e.g., via the client 320.

Figure 4:
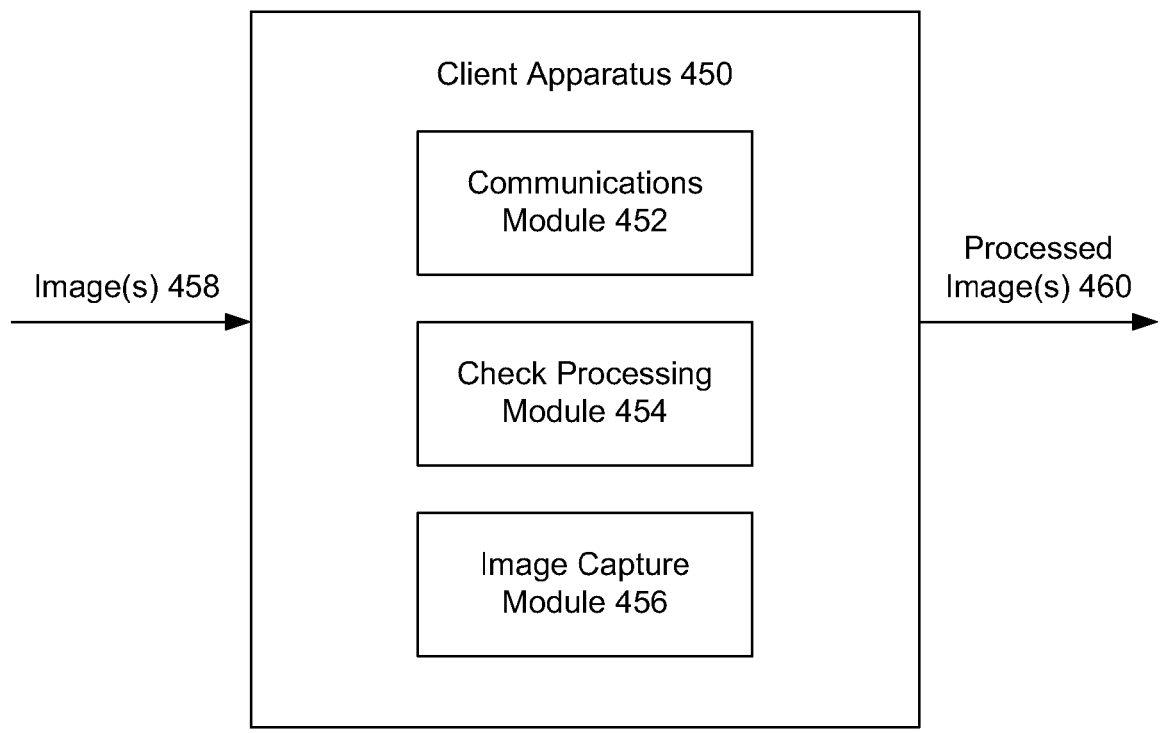
FIG. 4 shows a block diagram of a client apparatus for the deposit of a negotiable instrument, in accordance with an example embodiment.

FIG. 4 shows a block diagram of a client apparatus 450 for the deposit of a negotiable instrument, in accordance with an example embodiment. The client apparatus 450 may include one or more software objects operating on the client 320. The client apparatus 450 may include a communications module 452, a check processing module 454, and an image capture module 456. The client apparatus 450 may receive, in one example, one or more images 458 as an input and output one or more processed images 460.

In an implementation, the image(s) 458 may be received following a software call from the check processing module 454 to the image capture module 456. In such an implementation, the image capture module 456 may include the scanner 107 (or other imaging device) alone or in conjunction with a user computing device 109. The scanner 107 may be detachably coupled to the user computing device 109 such as through a secure digital (SD) slot or over any suitable communications bus, such as USB (universal serial bus).

Figure 5:
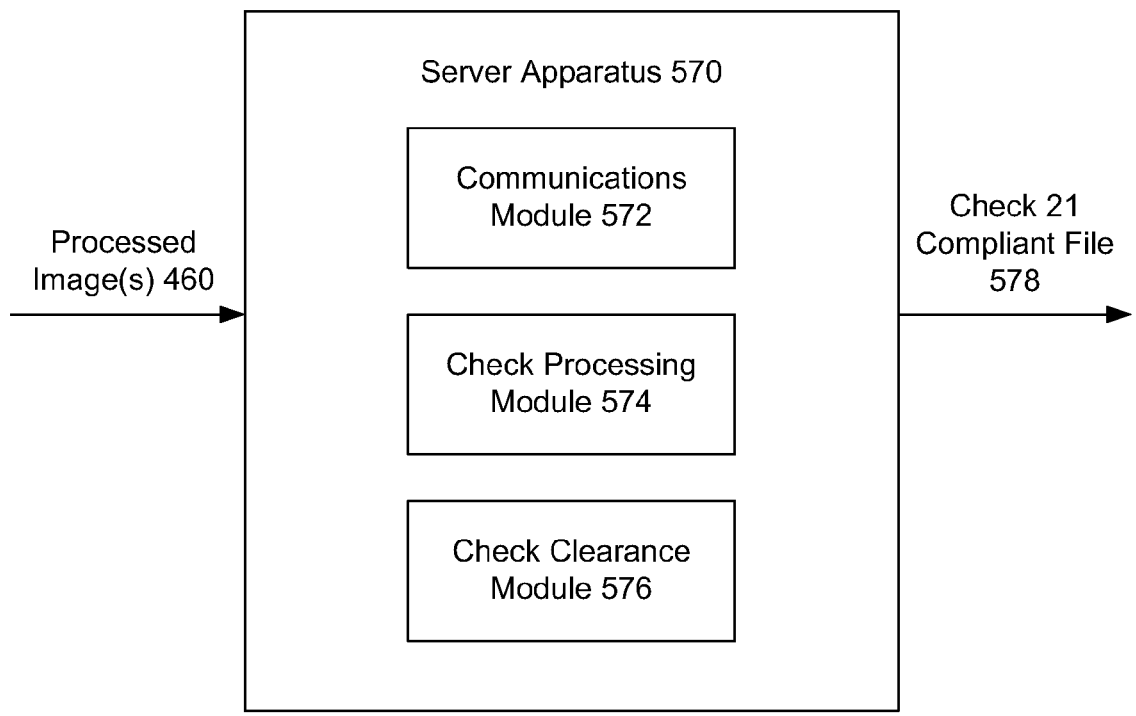
FIG. 5 shows a block diagram of a server apparatus for the deposit of a negotiable instrument, in accordance with an example embodiment.

In an implementation, the image capture module 456 may retrieve previously captured and stored image files (e.g., in local, remote, or removable storage associated with the client apparatus 450) and send the image files to an entity (e.g., institution 130, the server 322, the server apparatus 570 of FIG. 5, etc.) for processing.

In an implementation, the client apparatus 450 may comprise a browser such as a web browser, for accessing a website on the Internet or other network associated with an institution. The user may access the website and select a "capture image" link or similar icon, button or link, for example, displayed on the browser. Such a selection may call the image capture module 456 on the client apparatus 450.

The communications module 452 may be configured, in one example, to receive and send data signals over a suitable communications network. This may include, without limitation, GSM/GPR3, HSDPA, CDMA, TDMA, 802.11, 802.16 and the like. With respect to the present discussion, the communications module 452 may receive one or more processed images 460 from the check processing module 454 and may transmit them over a suitable communications network to the institution 130, as described herein, e.g., pursuant to the user selecting a "submit image" link or similar icon, button or link, for example, displayed on the browser.

The check processing module 454 may be configured, in one example, to cause the image capture module 456 to capture a digital image of at least one side of a negotiable instrument such as a check. The check processing module 454 may then perform one or more cleaning operations on the image of the check. These cleaning operations, at a high level, are intended to ensure that the image of the check is suitable for one or more processing tasks. For instance, if the check is rotated 45 degrees clockwise when captured, the check processing module 454 or a software object operated on the server 322 described above may be unable to optically detect information on the check. In this example, the check processing module 454 may deskew the image such that the image is no longer rotated.

Another aspect of an image that may be cleaned is a warping of the image. Warping, as used herein, is meant to denote that the check is tilted forward or back with respect to a plane that is perpendicular to a line drawn from the camera lens (e.g., of the scanner or other imaging device) to the center of the check. Warping, or tilting, of the image may also lead to incorrect optical detection of the check. In an implementation, the check processing module 454 may dewarp the image such that, in a three-dimensional space, the check would appear to be perpendicular to an imaginary line drawn from the center of the camera lens to the center of the check itself.

The check processing module 454, in further examples, may perform one or more other cleaning or processing operations. This may include down-converting the image received from the image capture module 456 to a suitable size, such as 200 dots per inch (DPI) resolution or in a resolution range such as 200 DPI to 400 DPI, 300 DPI to 500 DPI, etc., and/or converting the image to grayscale or black and white.

Alternatively, the check processing module 454 may send instructions to the image capture module 456 to cause the image capture module 456 to capture an image of the check at a particular resolution. The check processing module 454 may additionally perform any of the following operations, in further examples: convert from JPEG to TIFF, detect check information, perform signature detection on the image of the check, and the like. The check processing module 454 may, alternatively, send the captured image(s) to the server described herein for such processing and subsequent deposit of the check into an account of the user.

FIG. 5 shows a block diagram of a server apparatus 570 for the deposit of a negotiable instrument, in accordance with an example embodiment. The server apparatus 570 may include one or more software objects operating on the server 322. The server apparatus 570 may include a communications module 572, a check processing module 574, and a check clearance module 576. The server apparatus 570 may receive one or more processed images 460 from the client apparatus 450 as an input and may output a file such as a Check 21 compliant file 578. The Check 21 compliant file 578 may be a file or entry in a record set which is compliant with the clearinghouse rules set forth in the Check 21 Act and may include outputting an X9.37 file, in one example.

The communications module 572 may be configured to receive a wireless communication from the user computing device 109 over any suitable communications network, such as those described above. The check processing module 574 may be configured, in one example, to perform one or more check processing operations on the processed image(s) 460 that are received. In an implementation, these operations may include any of the operations described herein with respect to the check processing module 454 of FIG. 4. The operation of signature verification may be performed by the check processing module 574 of the server apparatus 570 as the server apparatus 570 may interface with other systems of the institution 130 that may maintain previously verified signature samples of the user 105.

A cropped grayscale image may be sent to the server apparatus 570. The server apparatus 570 may perform further processing to remove distortion such as warping. The server apparatus 570 may extract information via a TIFF conversion and determine the DPI and re-scale to another DPI (e.g., convert to TIFF and detect the DPI that was used in the grayscale image). In an implementation, DPI detection may run on the client apparatus 450.

The check clearance module 576 may be configured, in one example, to receive a file from the check processing module 574 and may communicate with a check clearinghouse such that a Check 21 compliant file 578 may be delivered to a check clearinghouse and funds may be received by the institution 130.

Figure 6:
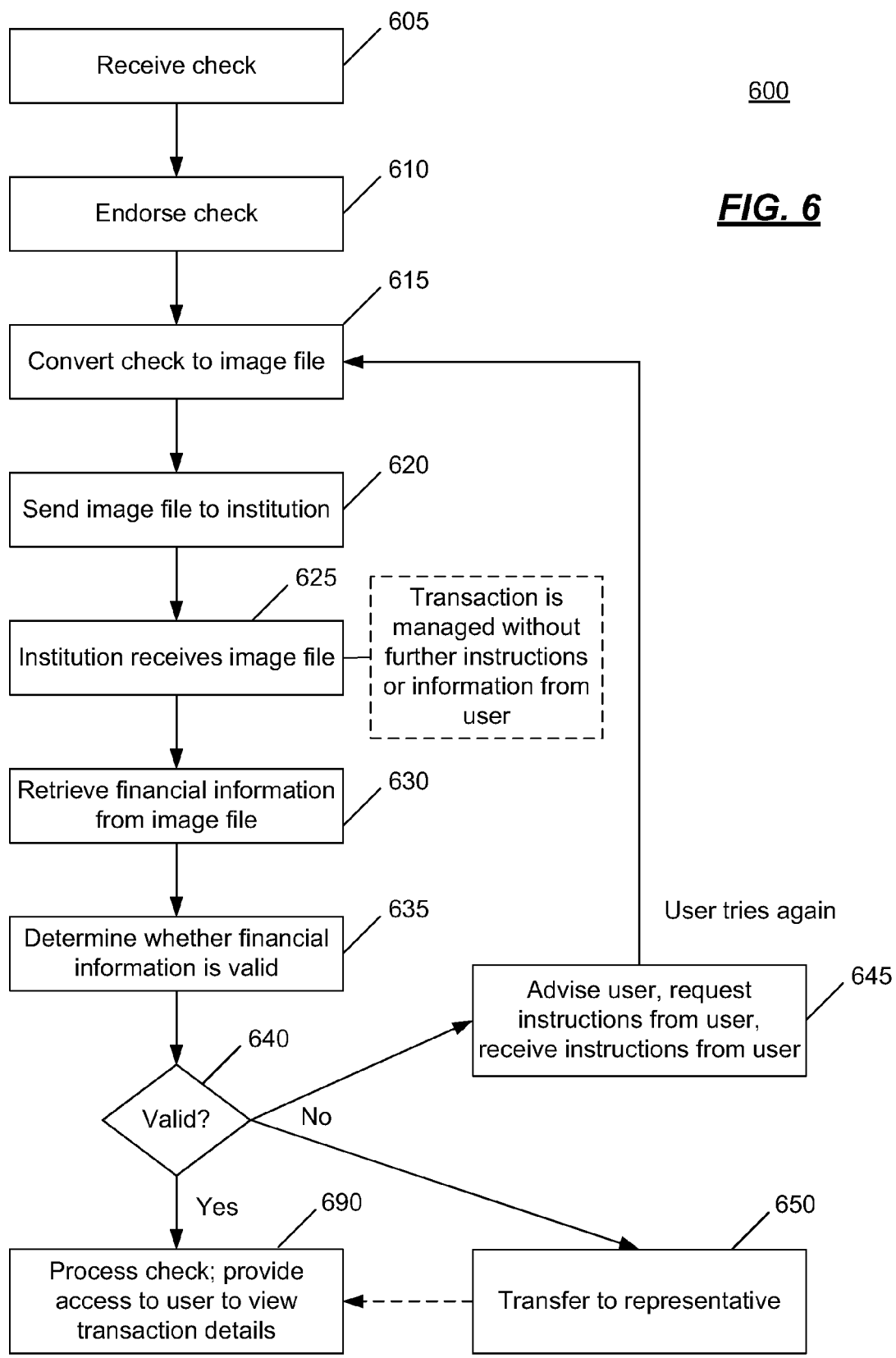
FIG. 6 is an operational flow of an implementation of a method that may be used for deposit of a negotiable instrument.

FIG. 6 is an operational flow of an implementation of a method 600 that may be used for deposit of a negotiable instrument. At 605, a user (e.g., an account owner, payee, etc.) may receive a check from a third party (i.e., a payor). At 610, the user may endorse the check by signing the back of the check in the designated field. If the user wishes to deposit the check into an account, such as a savings and/or checking account, they also may write an account number below the signature.

At 615, the user may convert the check into an image file that comprises electronic data representing an image of the check. For example, the user may create an image file comprising an image of the first side of the check, the second side of the check, or both. There may be several ways in which to create a digital image file of the check, including, but not limited to, a scanner, a digital camera, a personal computer (PC), and/or any other imaging device(s).

The user may open a communication pathway with an institution that may be associated with an account for depositing funds, by logging into a website for the institution, for example. There may be several ways in which a communication pathway may be established, including, but not limited to, an Internet connection via a website of the institution. The user may access the website and log into the website using credentials, such as, but not limited to, a username and a password.

At some point, the user may request access to a deposit system operated by the institution as described above by way of a user computing device, a cellular phone, a personal digital assistant (PDA), a handheld computing device, etc. operated by the user. The access may be through some sort of user login, in some examples. The deposit system may be configured to receive a deposit of a check from the user and clear the check in a suitable clearinghouse system.

The user may send a request to deposit the check and may select an account in which to deposit the check. In an implementation, the user may select a "deposit check" option provided on the website, and may enter details such as check amount, date, the account the check funds should be deposited in, comments, etc.

At 620, the user may transmit the image file to the institution. For example, the user may send the image file of the check to the institution using various means, including, but not limited to, an Internet connection via a website of the institution or a wireless cellular transmission. In an implementation, the image file may be sent to the institution via streaming. Alternatively, the user may attach the image file to an email and send the email to the institution.

Additionally, the image file may be augmented by secondary data which may be information relating to the check, such as an account number, a deposit amount, or a routing number associated with the check, and/or relating to the account for depositing funds, such as the account number and/or the name on the account. The account number may appear on the check itself, below the signature endorsing the check. The secondary data may be provided to the institution via an image file, an email, a facsimile, instant message, text message, or selection via a website associated with the institution (e.g., after the user opens a communication pathway with the institution, before or after the user sends the digital image file of the portions of the check or other negotiable instrument to the institution, etc.), for example.

At 625, the institution may receive the image file pertaining to the check along with financial information pertaining to the account for depositing funds and any secondary data. After the user submits the image file to the institution, the institution may manage the transaction without any further instructions or information from the user. No further action is required from the user for the deposit of the check to proceed. Any browser navigation away from a web page or website used to upload the image file or image(s) to the institution, communication failures, user logouts, etc. on the user side will not affect the processing and the deposit of the check.

At 630, the institution may open the image file and process the image file to retrieve financial information from the image file. The image file may be processed using any known technology to retrieve financial information regarding the check. Example technologies that may be used by the institution may include edge detection, image editing, filtering to remove imagery except the check in the received image, image sharpening, and technologies to distinguish between the front and the back sides of the check.

At 635, after retrieving the financial information from the check in an electronic data representation form, the institution may determine whether the financial information such as the amount payable to the user, the account associated with the user to deposit funds, an account associated with a payor to debit funds, and a financial institution associated with the payor and/or the user may be valid.

At 640, if the financial information is determined to be valid, the electronic data representation may be processed by the institution at 690, thereby depositing the check in the user's account. If the financial information is determined to be invalid at 640, the user may be advised at 645. For example, the institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the electronic deposit again (e.g., make another image file and send it to the institution) or whether the user would like assistance from a representative, for example. The user may indicate how they would like to proceed. If the user would like to try the electronic deposit again, processing may continue at 615 in an implementation. If the user would like assistance, the user may be put into contact with a representative of the institution.

In an implementation, if the financial information is determined to be invalid at 640, the financial information may be transferred to a representative for further review at 650. The representative, such as a customer service representative, a bank teller that may be located at a branch, a virtual bank teller that may be located remotely via an electronic device, or the like, may review the financial information associated with the electronic data representation to determine whether to allow the electronic data representation to be processed by the institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the institution at 690, thereby depositing the check in the user's account.

In an implementation, at 690, the institution may process the electronic data representation of the check. To credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. The ACH service provider may process the debit entry by identifying the account and bank from which the check may be drawn. If the payor's bank verifies the transaction, the ACH service provider may settle the transaction by debiting the payor's bank and crediting the user's bank. The payor's bank may then debit the payor's account.

The user may receive a notice via email, facsimile, instant message, or mail, for example, that the check has been deposited into the selected account. Additionally or alternatively, the user may be provided with access to the institution (e.g., via a link to a website) to view transaction details. This allows the user to view whether the transaction was successful (e.g., whether the image file was successfully received and processed at the institution, whether the check was processed and funds were deposited in an account, etc.). In an implementation, if the check is not successfully deposited, the institution may provide additional options to the user on how to redeem the check, such as mailing the check to the institution or the like.

Although the examples described herein may refer to checks, it is contemplated that any negotiable instruments may be processed using the techniques described herein.

Exemplary Computing Arrangement

Figure 7:
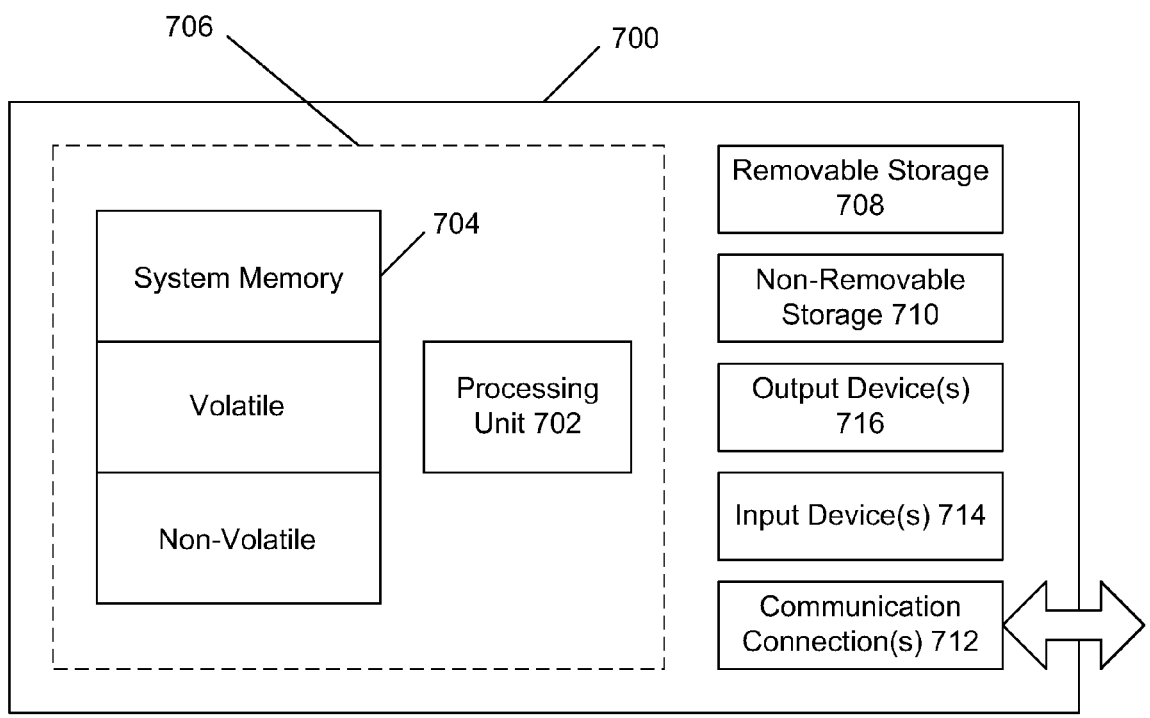
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and system memory 704. Depending on the exact configuration and type of computing device, system memory 704 may be volatile (such as RAM), non-volatile (such as read-only memory (ROM), flash memory, etc.), or some combination of the two. This most basic configuration is illustrated in FIG. 7 by dashed line 706.

Computing device 700 may have additional features and/or functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer-readable media. Computer-readable media can be any available media that can be accessed by computing device 700 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 704, removable storage 708, and non-removable storage 710 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may also contain communication connection(s) 712 that allow the computing device 700 to communicate with other devices. Communication connection(s) 712 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Computing device 700 may be one of a plurality of computing devices 700 inter-connected by a network. As may be appreciated, the network may be any appropriate network, each computing device 700 may be connected thereto by way of communication connection(s) 712 in any appropriate manner, and each computing device 700 may communicate with one or more of the other computing devices 700 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An atomic deposit transaction method, comprising:
    instantiating a remote deposit transaction including providing user authenticating credentials to a server at an institution;
    generating a digital image file of a physical negotiable instrument via a general purpose imaging device, the general purpose imaging device coupled to a user owned computing device;
    providing the digital image file of the physical negotiable instrument to the server at the institution for processing via a communications connection between the user owned computing device and the institution for deposit of the physical negotiable instrument into a deposit account of the user;
    failing to provide any user-specified end-of-transaction information to the institution after providing the digital image file to the institution, the digital image file being processed by the server at the institution to deposit funds of the physical negotiable instrument into the deposit account of the user, without the server at the institution receiving any user-specified end-of-transaction information from the user owned computing device after receiving the digital image file; and
    receiving information at the user owned computing device pertaining to the processing of the digital image file and the depositing of funds of the physical negotiable instrument into the deposit account.

2. The method of claim 1, wherein receiving the information comprises accessing a website of the institution to obtain the information.

3. The method of claim 2, wherein providing the digital image file comprises selecting a link on the website and submitting the digital image file via the link.

4. The method of claim 1, wherein the communications connection comprises an Internet connection or a wireless cellular connection.

5. The method of claim 1, wherein providing the digital image file comprises streaming the digital image file to the institution.

6. The method of claim 1, further comprising generating the digital image file by capturing at least one image of the physical negotiable instrument via the general purpose imaging device.

7. The method of claim 1, wherein the physical negotiable instrument comprises a check.

8. A computer-readable medium comprising computer-readable instructions for an atomic deposit transaction, said computer-readable instructions issuable by a processor to:
   instantiate a remote deposit transaction including providing user authenticating credentials to a server at an institution;
   generate a digital image file of a physical negotiable instrument via a general purpose imaging device, the general purpose imaging device coupled to a user owned computing device;
   provide the digital image file of the physical negotiable instrument to the server at the institution for processing via a communications connection between the user owned computing device and the institution for deposit of the physical negotiable instrument into a deposit account of the user;
   fail to provide any user-specified end-of-transaction information to the server at the institution after providing the digital image file to the institution, the digital image file being processed by the server at the institution to deposit funds of the physical negotiable instrument into the deposit account of the user, without the institution receiving any user-specified end-of-transaction information from the user owned computing device after receiving the digital image file; and
   receive information at the user owned computing device pertaining to the processing of the digital image file and the depositing of funds of the physical negotiable instrument into the deposit account.

9. The computer-readable medium of claim 8, wherein the instructions that receive the information comprise instructions that access a website of the institution to obtain the information.

10. The computer-readable medium of claim 9, wherein the instructions that provide the digital image file comprise instructions that select a link on the website and submit the digital image file via the link.

11. The computer-readable medium of claim 8, wherein the communications connection comprises an Internet connection or a wireless cellular connection.

12. The computer-readable medium of claim 8, wherein the instructions that provide the digital image file comprise instructions that stream the digital image file to the institution.

13. The computer-readable medium of claim 8, further comprising instructions that generate the digital image file by capturing at least one image of the physical negotiable instrument via the general purpose imaging device.

14. The computer-readable medium of claim 8, wherein the physical negotiable instrument comprises a check.

15. A system for atomic deposit transaction, comprising:
   a memory;
   a processor disposed in communication with said memory, and configured to issue a plurality of processing instructions stored in the memory, wherein the processor issues instructions to:
   instantiate a remote deposit transaction including providing user authenticating credentials to a server at an institution;
   generate a digital image file of a physical negotiable instrument via a general purpose imaging device, the general purpose imaging device coupled to a user owned computing device;
   provide the digital image file of the physical negotiable instrument to the server at the institution for processing via a communications connection between the user owned computing device and the institution for deposit of the physical negotiable instrument into a deposit account of the user;
   fail to provide any user-specified end-of-transaction information to the server at the institution after providing the digital image file to the institution, the digital image file being processed by the server at the institution to deposit funds of the physical negotiable instrument into the deposit account of the user, without the institution receiving any user-specified end-of-transaction information from the user owned computing device after receiving the digital image file; and
   receive information at the user owned computing device pertaining to the processing of the digital image file and the depositing of funds of the physical negotiable instrument into the deposit account.

16. The system of claim 15, wherein the processor further issues instructions to access a website of the institution to obtain the received information.

17. The system of claim 16, wherein the processor further issues instructions to select a link on the website and submit the digital image file via the link.

18. The system of claim 15, wherein the communications connection comprises an Internet connection or a wireless cellular connection.

19. The system of claim 15, wherein the processor further issues instructions to stream the digital image file to the institution.

20. The system of claim 15, wherein the processor further issues instructions to generate the digital image file by capturing at least one image of the physical negotiable instrument via the general purpose imaging device.

21. The system of claim 15, wherein the physical negotiable instrument comprises a check.

22. The method of claim 1, further comprising: severing the communications connection without providing any user-specified information to the institution other than the digital image file.

23. The computer-readable medium of claim 8, further comprising instructions that sever the communications connection without providing any user-specified information to the institution other than the digital image file.

24. The system of claim 15, wherein the processor further issues instructions to severing the communications connection without providing any user-specified information to the institution other than the digital image file.

* * * * *